United States Patent
Cannon

(10) Patent No.: US 6,717,803 B2
(45) Date of Patent: Apr. 6, 2004

(54) BRACKET FOR QUICK INSTALLATION AND REMOVAL OF SYSTEM COMPONENTS IN A COMPUTER SYSTEM

(75) Inventor: James Edward Cannon, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 95 days.

(21) Appl. No.: 10/075,831

(22) Filed: Feb. 12, 2002

(65) Prior Publication Data

US 2003/0151889 A1 Aug. 14, 2003

(51) Int. Cl.[7] .................................................. G06F 1/16
(52) U.S. Cl. ........................ 361/683; 361/685; 312/333; 360/137
(58) Field of Search ................................ 361/685, 683, 361/724–727, 610; 312/333, 300, 302, 223.1, 0.2, 317.1; 360/92.01, 98.01, 132, 137, 137 D

(56) References Cited

U.S. PATENT DOCUMENTS

| | | | |
|---|---|---|---|
| 5,123,721 A | | 6/1992 | Seo |
| 5,136,466 A | | 8/1992 | Remise et al. |
| 5,224,019 A | * | 6/1993 | Wong et al. ................. 361/685 |
| 5,306,079 A | * | 4/1994 | Liu ........................... 312/223.2 |
| 5,319,519 A | | 6/1994 | Sheppard et al. |
| 5,600,538 A | * | 2/1997 | Xanthopoulos ............. 361/683 |
| 5,680,293 A | | 10/1997 | McAnally et al. |
| 5,940,265 A | * | 8/1999 | Ho ............................... 361/685 |
| 6,229,696 B1 | * | 5/2001 | Lin et al. ..................... 361/683 |
| 6,256,195 B1 | * | 7/2001 | Liao ............................ 361/685 |
| 6,297,954 B1 | | 10/2001 | Seo |
| 6,469,890 B1 | * | 10/2002 | Gan ............................ 361/685 |

* cited by examiner

Primary Examiner—Lisa Lea-Edmonds

(57) ABSTRACT

A bracket attached to a peripheral device of a computer system aligns and attaches the peripheral device to the inside of a computer system chassis. The bracket is detachably mountable and includes a bracket body having an aperture therein through which the peripheral device is inserted. The bracket includes a support bar having a tab that fits into a slot in the chassis to securely hold the peripheral device in position such that the front panel of the peripheral device is aligned within an aperture in a face of the chassis.

20 Claims, 14 Drawing Sheets

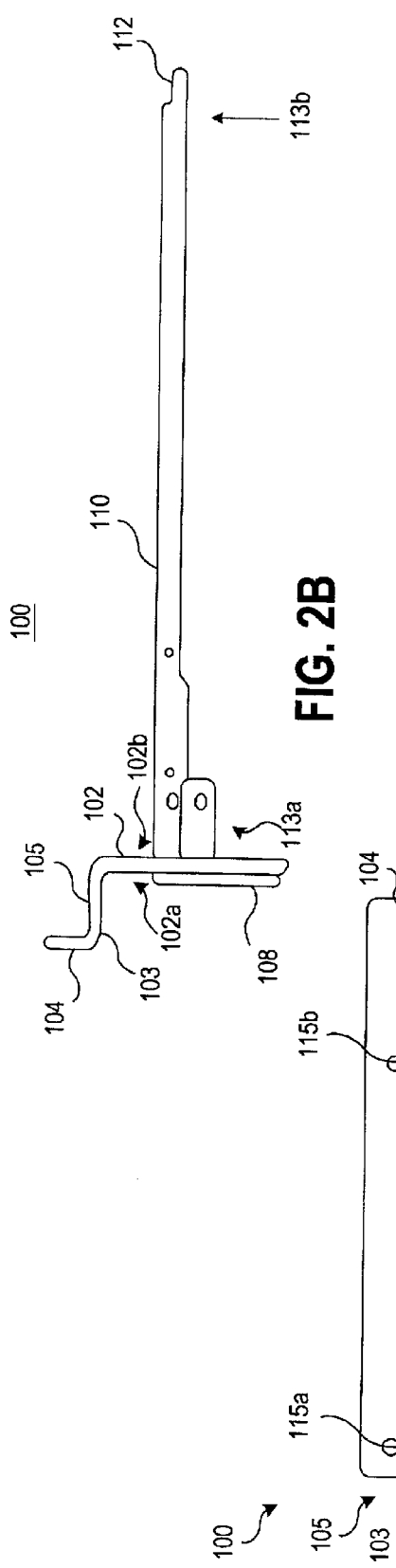
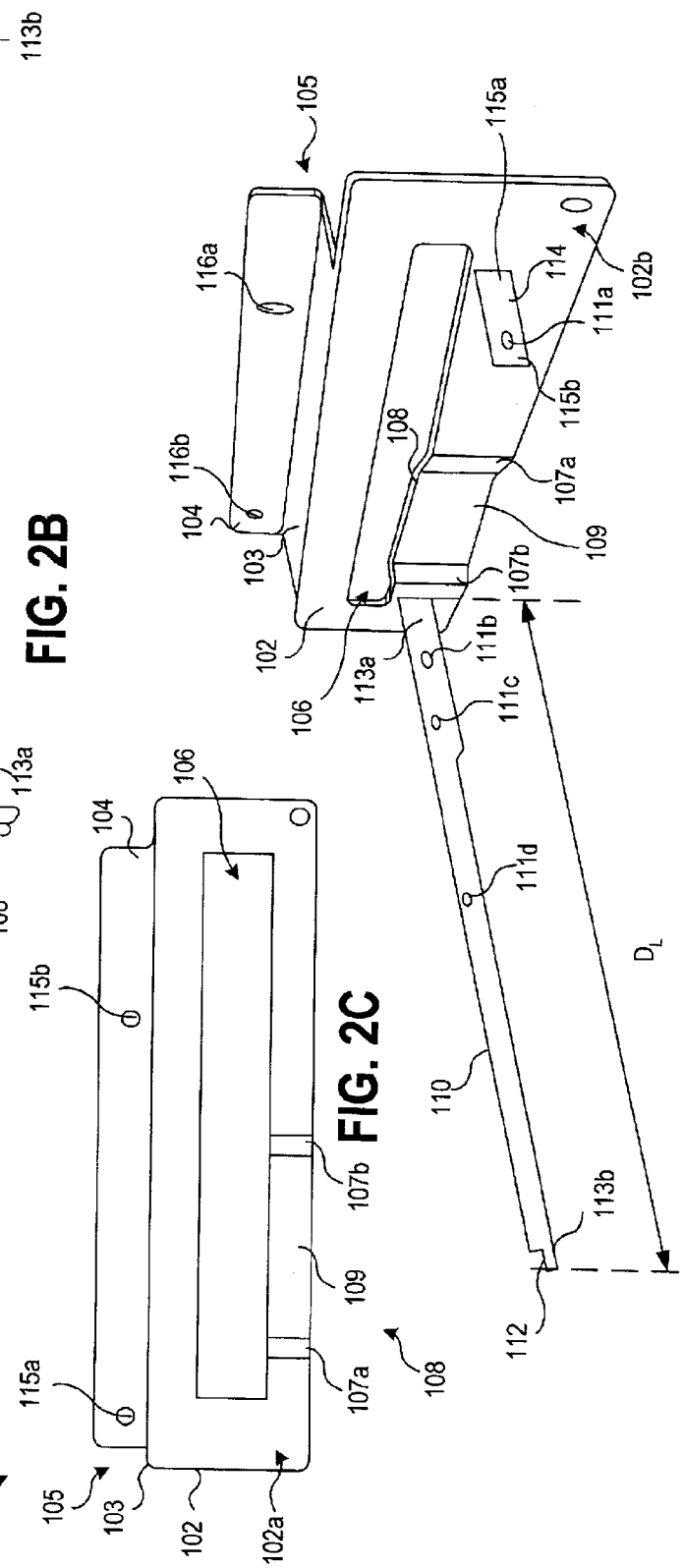

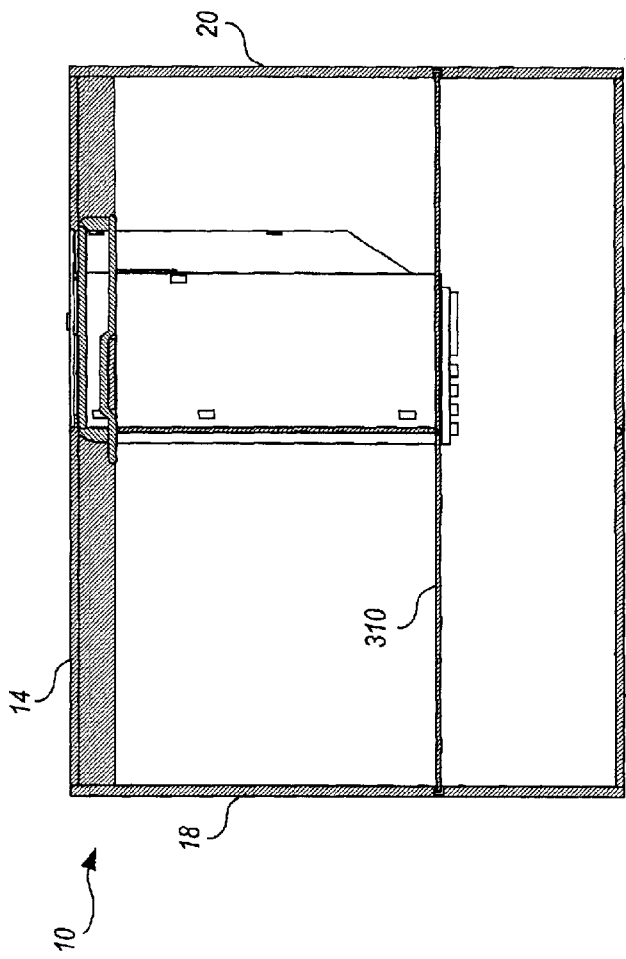
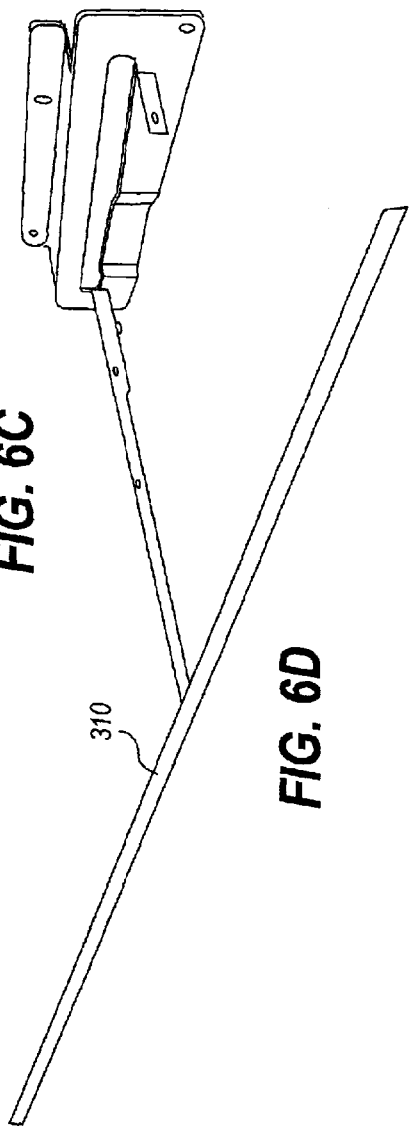
FIG. 6C
FIG. 6D

BRACKET FOR QUICK INSTALLATION AND REMOVAL OF SYSTEM COMPONENTS IN A COMPUTER SYSTEM

FIELD OF THE INVENTION

The present invention relates, in general, to computer system assembly and, more particularly, to a bracket mount for a system component that allows fast simple attachment and removal of system components, such as a peripheral CD, DVD, and floppy disk drives, to a computer system chassis.

BACKGROUND OF THE INVENTION

The increasing reliance upon computer systems to collect, process, and analyze data has led to the continuous improvement of the system assembly process and associated hardware.

A typical computer system comprises one or more circuit boards and various semi-autonomous system components such as hard disk drives, peripheral storage devices, and rotary cooling fans. The circuit boards and system components are typically housed together in a housing called a chassis.

With the trend towards smaller and sleeker packaging designs, the positioning of the various circuit boards and system components within the chassis is the subject of much study. Often certain circuit boards and components must be positioned within a predetermined distance of one another to meet electrical cabling specifications. On the other hand, due to the high amount of heat dissipated by the electrical circuit boards and components, a certain amount of airspace must often be maintained between the various circuit boards and components to allow sufficient air flow needed for cooling the components.

Attachment of circuit boards and system components within the computer system housing is another area of concern.

A given computer system must typically provide enough shielding to sufficiently reduce electromagnetic radiation emissions from the system to meet Federal Communications Commission (FCC) requirements. Thus, when a component is attached to a face of the housing, the attachment must typically be such as to prevent excessive leakage of electromagnetic radiation from the system when assembled.

If the computer system is to be mass-produced, considerations for fast, easy assembly must also be addressed; accordingly, the circuit boards and system components must be easy to install within a short amount of time. Attachment of the components must be secure and not subject to loosening over time due to system vibration, for example caused by motors and other components with moving parts such as rotary cooling fans. Such loosening results in noise which can interfere with the performance of the system.

To eliminate some of the assembly time required to install system components in the bay of a computer system chassis, it would be desirable to provide a peripheral mounting system for a computer system chassis that allows fast insertion and removal of system peripherals without requiring any specialized assembly or removal equipment.

SUMMARY OF THE INVENTION

Accordingly, it is an object of the present invention to provide an improved peripheral mounting system for a computer system.

It is another object to provide a peripheral mounting system for a computer system that allows fast insertion and removal of a system peripheral without requiring any specialized equipment.

It is yet another object to provide a peripheral mounting system for a computer system that does not require a large number of components.

It is still another object to provide a peripheral mounting system that prevents excessive electromagnetic radiation leaking from the system chassis.

To accomplish these and other objects, a peripheral mounting device is provided in the form of a bracket mounted to the peripheral and snapped into position to securely attach the peripheral within the bay of the chassis. A bay, or recess, is positioned in the chassis to receive the peripheral device. The bracket of the invention includes a bracket face plate having a aperture therein form-fitted to the circumferential shape of the peripheral device at the cross-section of the device that it will support. The peripheral device is inserted through the aperture of the bracket face plate, and the bracket of the invention is fixedly attached to the peripheral device via screws or other means. The bracket includes a support bar with at least one tab. To attach the peripheral device in position within the bay of the chassis, the tab of the bracket support bar is inserted into a corresponding support slot in the chassis, and the front panel of the system component is snapped into place in its corresponding position on a chassis face.

In the preferred embodiment, the bracket face plate includes a hook portion that fits over a lance provided on the panel chassis. Accordingly, to secure the peripheral device to the chassis, the tab of the bracket support bar is inserted into its corresponding support slot on the chassis, and the hook portion of the bracket face plate is hooked over the lance on the chassis with the application of manual pressure until the bracket snaps into position such that the front face of the peripheral device is aligned within a peripheral device face hole in the chassis panel. To remove the system component from the bay of the chassis, the user manually applies pressure on the front panel of the system component such that it clears the upper edge of the aperture of chassis. The bracketed system component is then pivoted up and away from the chassis aperture to unhook the hook portion from the lance. The support bar tab is then removed from its slot on the chassis, and the bracketed system component is then pulled out of the bay. Accordingly, the peripheral device can be removed in a matter of seconds to allow access to other devices and circuitry within the bay.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 2B is a side view of the bracket of FIG. 2A;

FIG. 2C is a front view of the bracket of FIGS. 2A and 2B;

FIG. 2D is a perspective view of the bracket of FIGS. 2A, 2B, and 2C;

FIG. 6C is a cross-sectional top view of a chassis illustrating an alternative embodiment of the invention wherein the support bar is configured in a T-shape and is seated within a pair of support tab slots in a pair of chassis faces adjacent to the lateral face of the chassis;

FIG. 6D is a perspective view of the bracket of FIG. 6C;

DETAILED DESCRIPTION OF THE DRAWINGS

Figure 1:
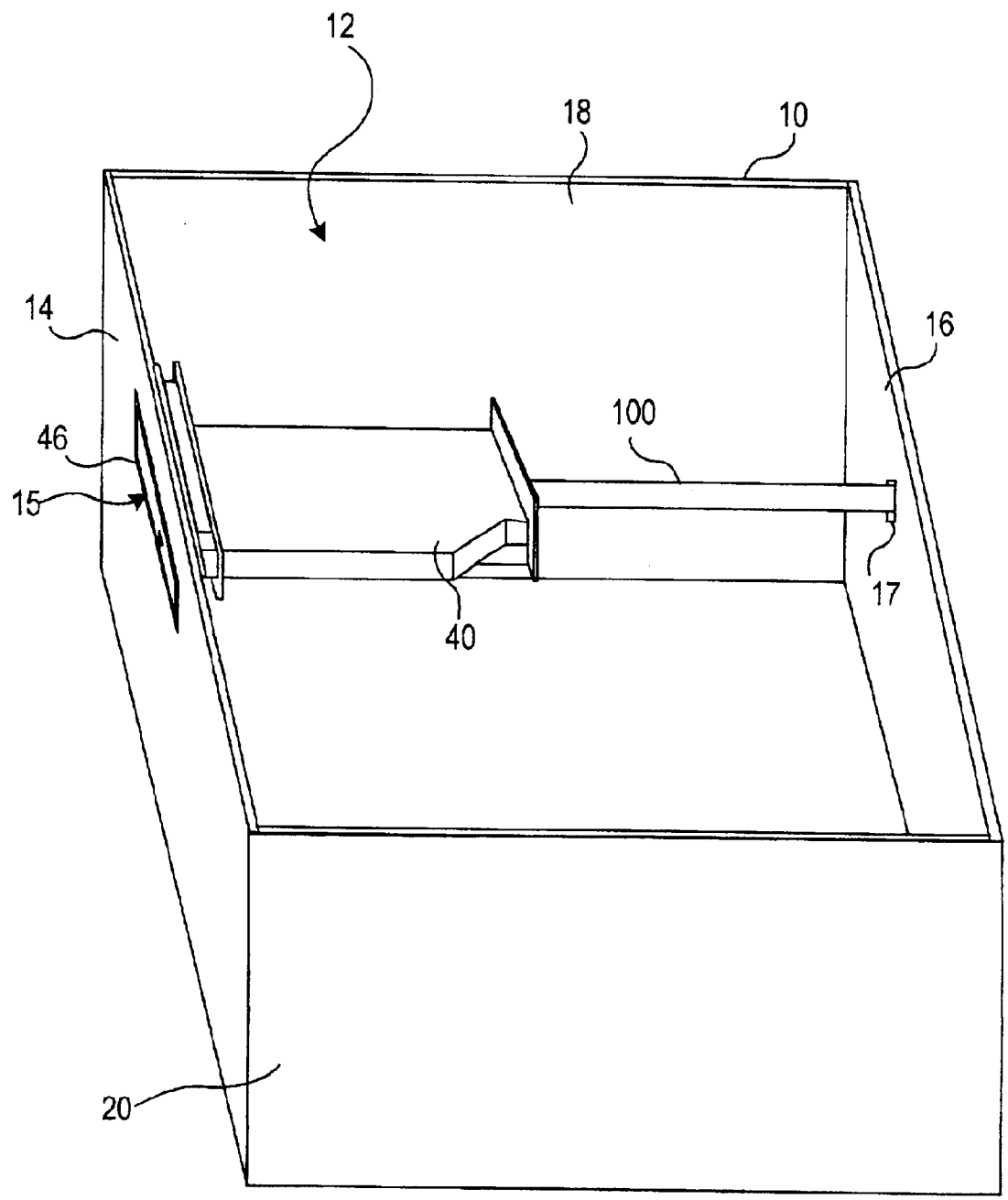
FIG. 1 is a perspective view of a chassis of a computer system and a peripheral device that is mounted therein by a bracket implemented in accordance with the invention.
Figure 2A:
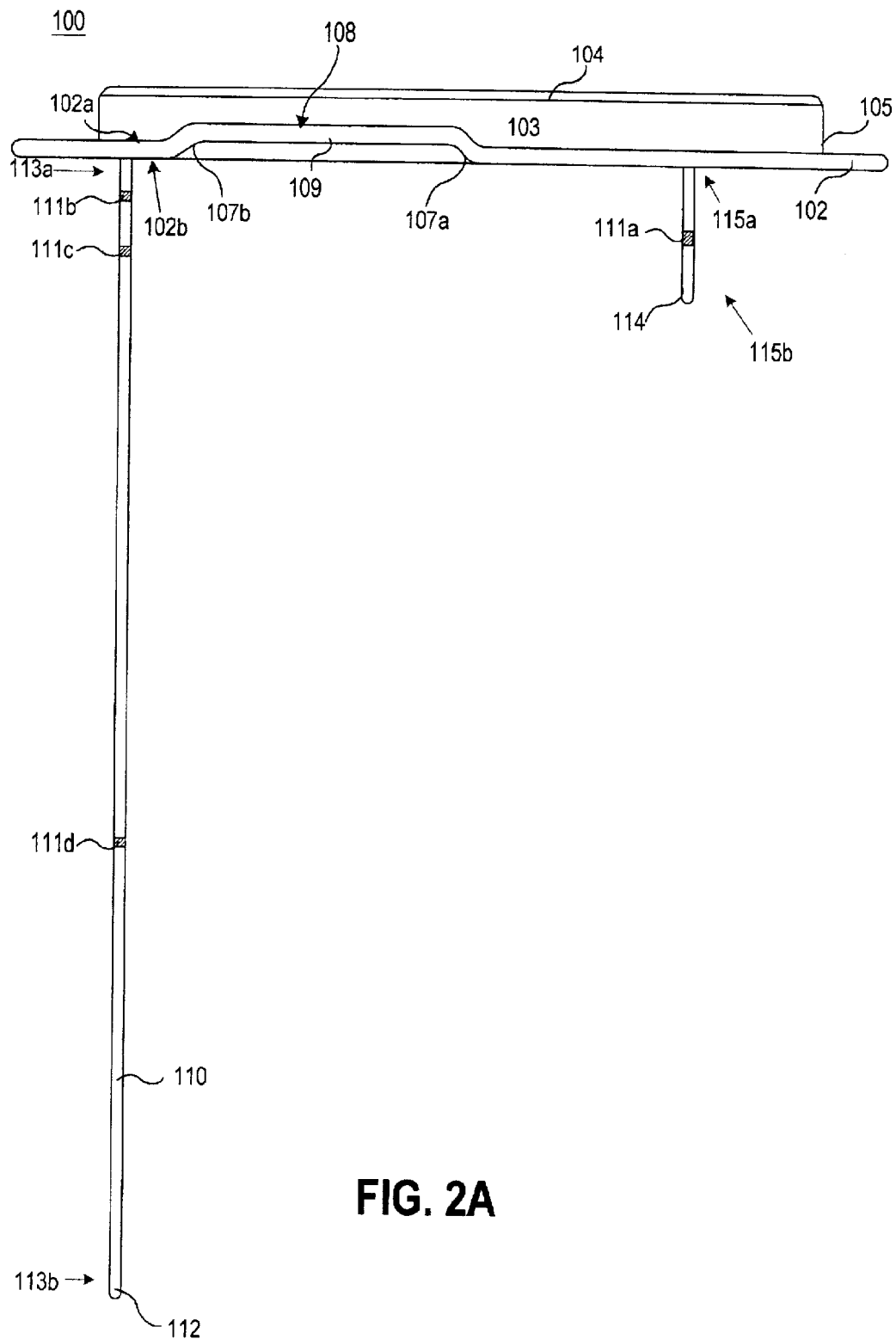
FIG. 2A is a top view of a first embodiment of a bracket implemented in accordance with the invention.
Figure 3A:
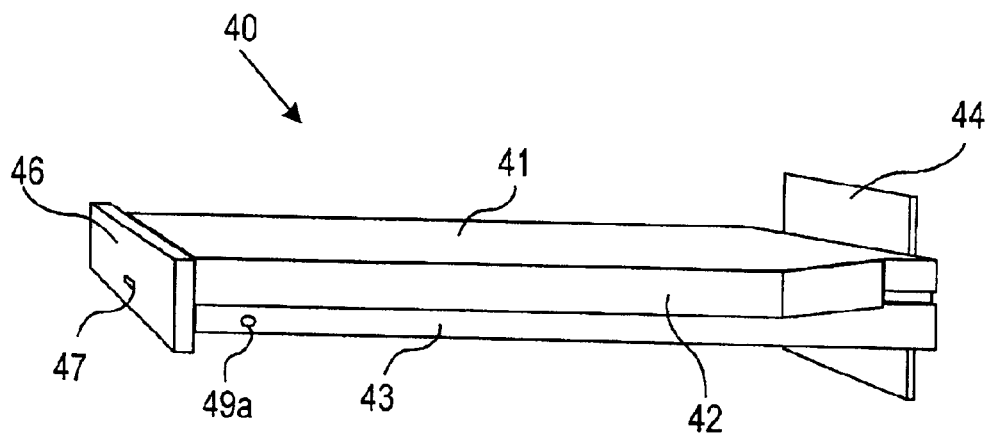
FIG. 3A is front perspective view of a CD-ROM drive implementing a peripheral device for illustration of the invention.
Figure 3B:
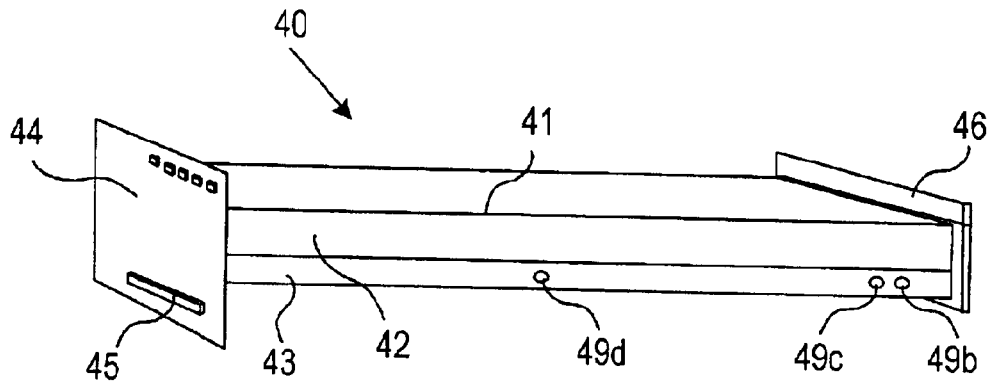
FIG. 3B is a rear perspective view of the CD drive of FIG. 3A.
Figure 3C:
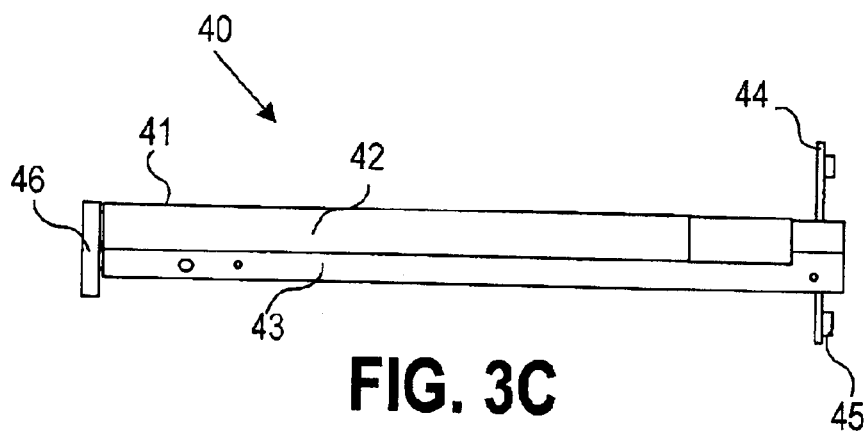
FIG. 3C is a side view of the CD drive of FIGS. 3A and 3B.
Figure 3D:
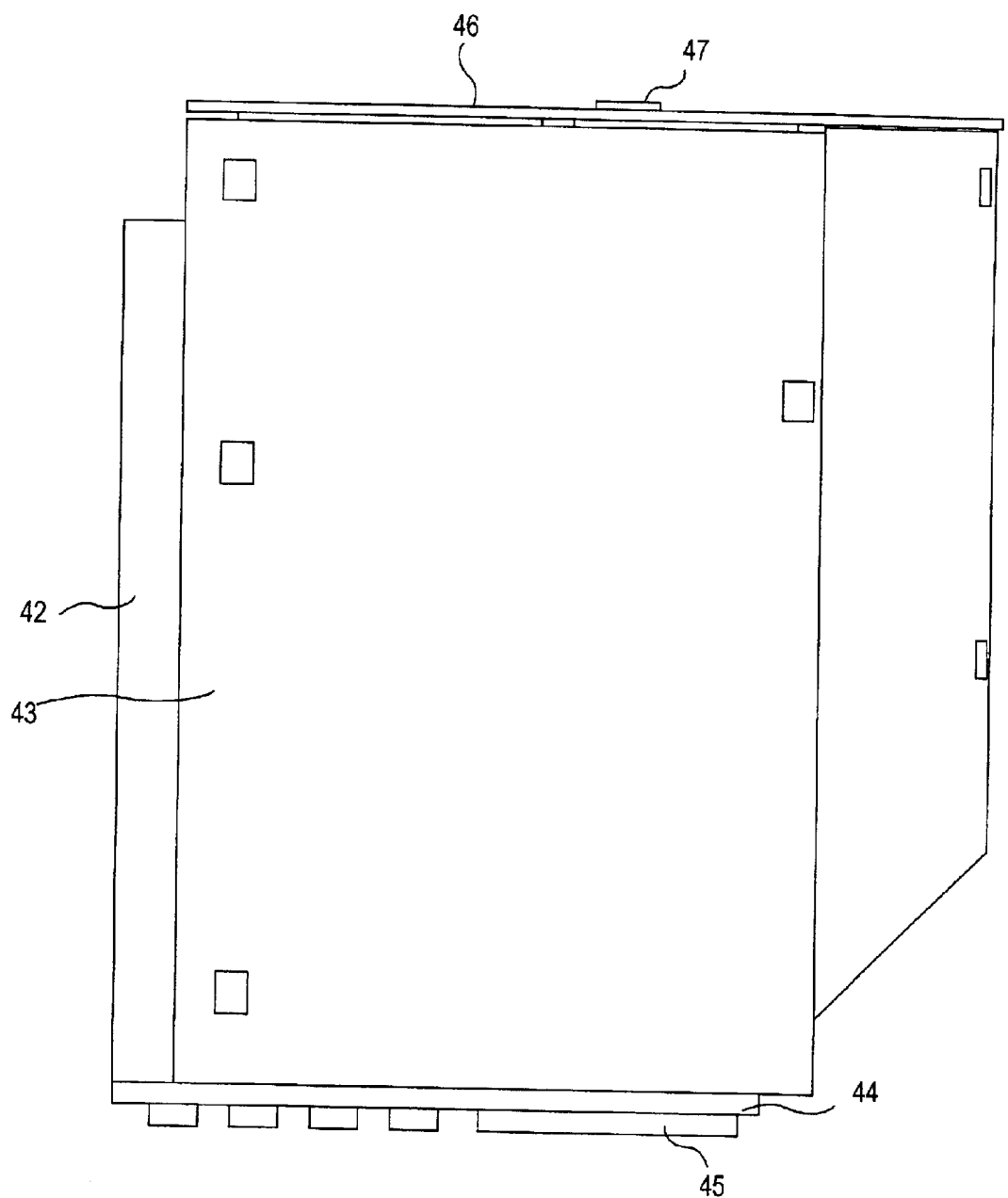
FIG. 3D is a bottom view of the CD drive of FIGS. 3A–3C.

Turning now to the drawings, FIG. 1 illustrates chassis 10 of a computer system. The chassis has a bay, or recess, 12 for housing a peripheral device 40, such as a CD-ROM drive. Bay 12 has a configuration and construction suitable for seating peripheral device 40. The chassis 10 forms lateral face 14 of the bay 12. Lateral face 14 forms an aperture 15 through which a front panel 46 of the peripheral device 40 is accessible.

Peripheral device 40 is secured within the bay 12 of the chassis 10, as discussed in more detail hereinafter, using a bracket 100 implemented in accordance with the invention.

FIGS. 2A–2D illustrate a preferred embodiment of bracket 100. As illustrated, bracket 100 comprises a face plate 102 having an aperture 106 formed therein that is preferably form-fitted to the cross-sectional shape of the portion of the peripheral device 40 that it is designed to support. In the preferred embodiment, a hook portion 108 is formed in face plate 102, for reasons explained hereinafter. In the illustrative embodiment, hook portion 108 is formed with opposing angled faces 107a and 107b connected by a flat face 109. Preferably, the hook portion 108 is formed integral to the face plate 102.

Bracket 100 also comprises at least one support bar 110 having a proximal end 113a attached to and extending normal to the rear face 102b of the face plate 102. Support bar 110 preferably includes a tab 112 at the distal end 113b of the support bar 110 which is configured to fit into a matching slot on the chassis 10, as described hereinafter. Bracket 100 in the illustrative embodiment also includes an attachment bar 114 having a proximal end 115a attached to and extending normal to the rear face 102b of the face plate 102. Attachment bar 114 includes attachment mechanism 111a and support bar 110 includes attachment mechanisms 111b, 111c, and 111d, which allow the bracket 100 to be attached to the peripheral device 40. In the illustrative embodiment, attachment mechanisms 111a–111d are screw holes formed in the attachment bar 114 and support bar 110 through which screws may be inserted and screwed in through the screw holes in the attachment and support bars and into screw holes formed in the peripheral device 40.

In the preferred embodiment, bracket 100 provides electromagnetic radiation shielding surrounding the peripheral device 40 on the lateral face 14 of the chassis 10 when the peripheral device 40 is installed in the chassis. To this end, face plate 102 includes a shielding seat 105 which, when the bracket 100 is seated in the chassis, seats securely against the frame of the chassis 10 to prevent electromagnetic radiation from emitting through the aperture 15 of the lateral face 14 of the chassis 10.

FIGS. 3A–3D illustrate an example embodiment of a peripheral device 40. In this embodiment, peripheral device 40 is a semi-autonomous CD-ROM drive with a front panel 46 connected at a front end of the drive 40, a housing 41, and a connector circuit board 44 connectable at the rear end of the drive 40. Front panel 46 includes the open/close button 47 which opens/closes the CD-ROM tray (not shown). The housing comprises an upper tray housing 42 and a lower circuit board housing 43. In the illustrative embodiment, the CD-ROM drive manufacturer provides attachment screw holes 49a, 49b, 49c, and 49d on the lateral sides of the lower circuit board housing 43. The rear end of the housing is attachable to a connector circuit board 44 on which a cable connector 45 is provided for connection to a cable (not shown).

Figure 4A:
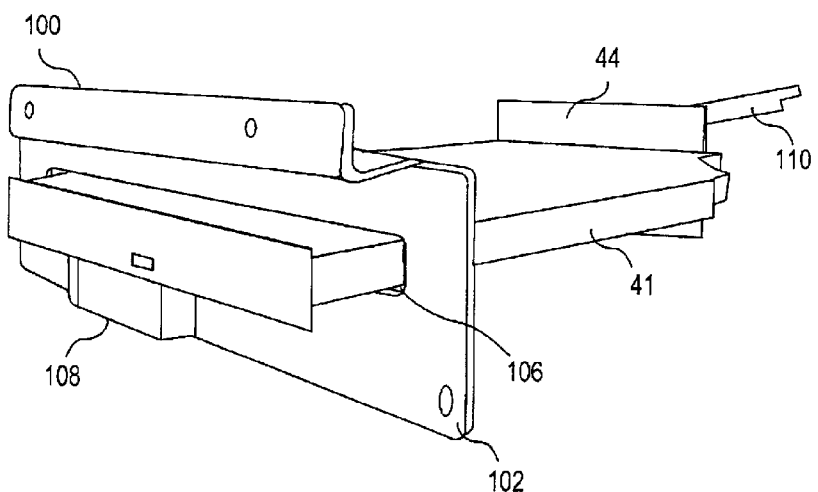
FIG. 4A is a perspective view of the bracket of FIGS. 2A–2D attached to the peripheral device of FIGS. 3A–3D.
Figure 4C:
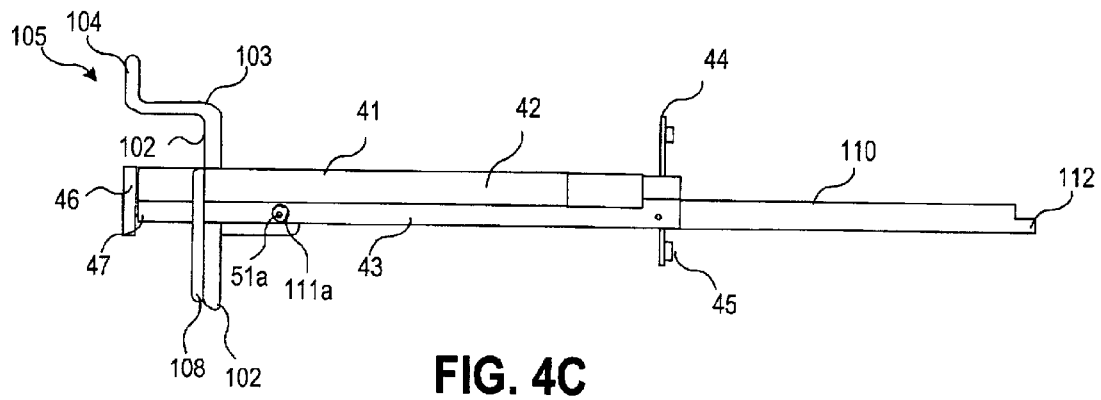
FIG. 4C is a cross-sectional side view of the bracketed peripheral device of FIGS. 4A–4B.
Figure 4B:
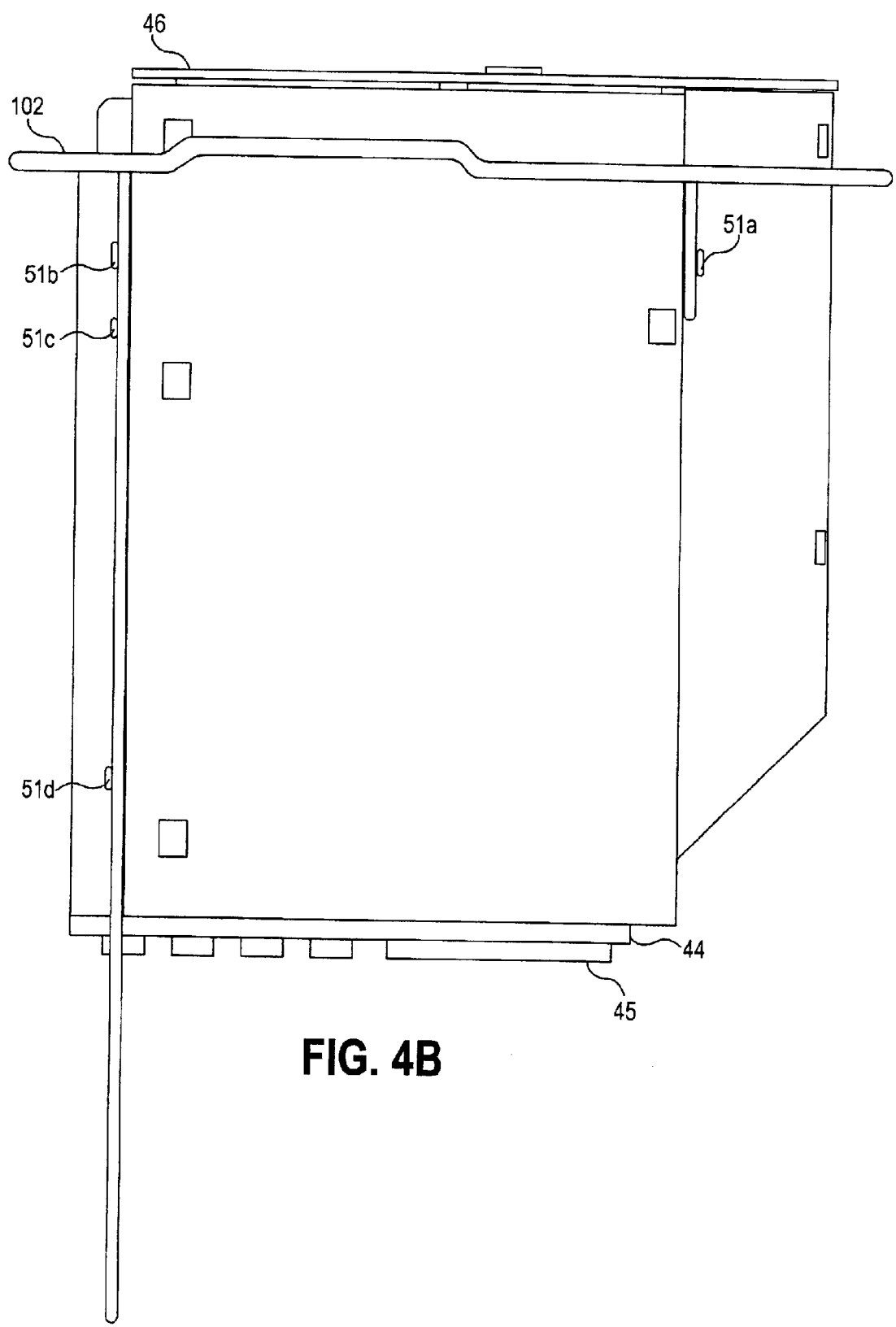
FIG. 4B is a top view of the bracketed peripheral device of FIG. 4A.

FIGS. 4A–4F and 5A–5B demonstrate the insertion of a peripheral device 40 into a chassis 10 using the bracket 100 of the invention. As illustrated in FIGS. 4A and 4B, the peripheral device 40 slides through the aperture 106 of the bracket face plate 102. To this end, the peripheral device 40 is slid through the bracket body aperture 106 until the attachment mechanisms 49a, 49b, 49c, 49d on the drive 40 are aligned with the attachment mechanisms 111a, 111b, 111c, 111d of the bracket 100. The aligned attachment mechanisms are then attached together. In the illustrative embodiment, the bracket 100 is attached to the peripheral device 40 using screws 51a, 51b, 51c, 51d, as shown in FIGS. 4B and 4C. The connector circuit board 44 is then attached to the peripheral device 40.

Figure 4D:
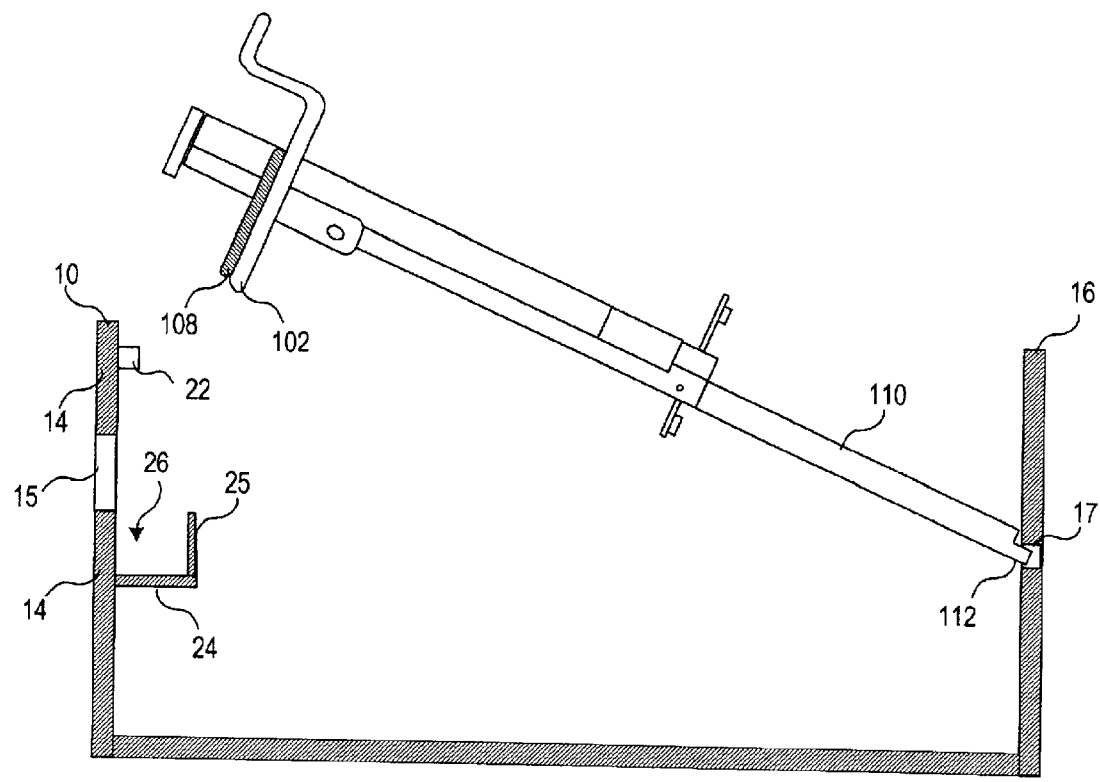
FIG. 4D is a cross-sectional side view of a chassis configured to house the bracketed peripheral device of FIGS. 4A–4C, with the support bar tab of the bracket inserted in the support tab slot of the chassis.
Figure 4E:
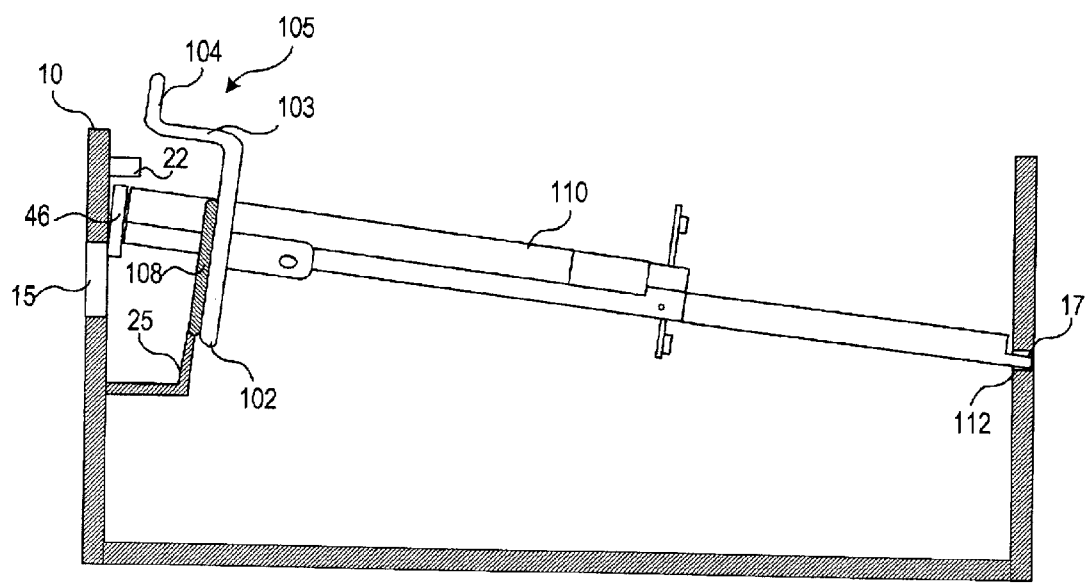
FIG. 4E is a cross-sectional side view of the chassis of FIG. 4D, illustrating the engagement of the face panel of the bracket of the invention with the lance on the frame of the chassis.
Figure 4F:
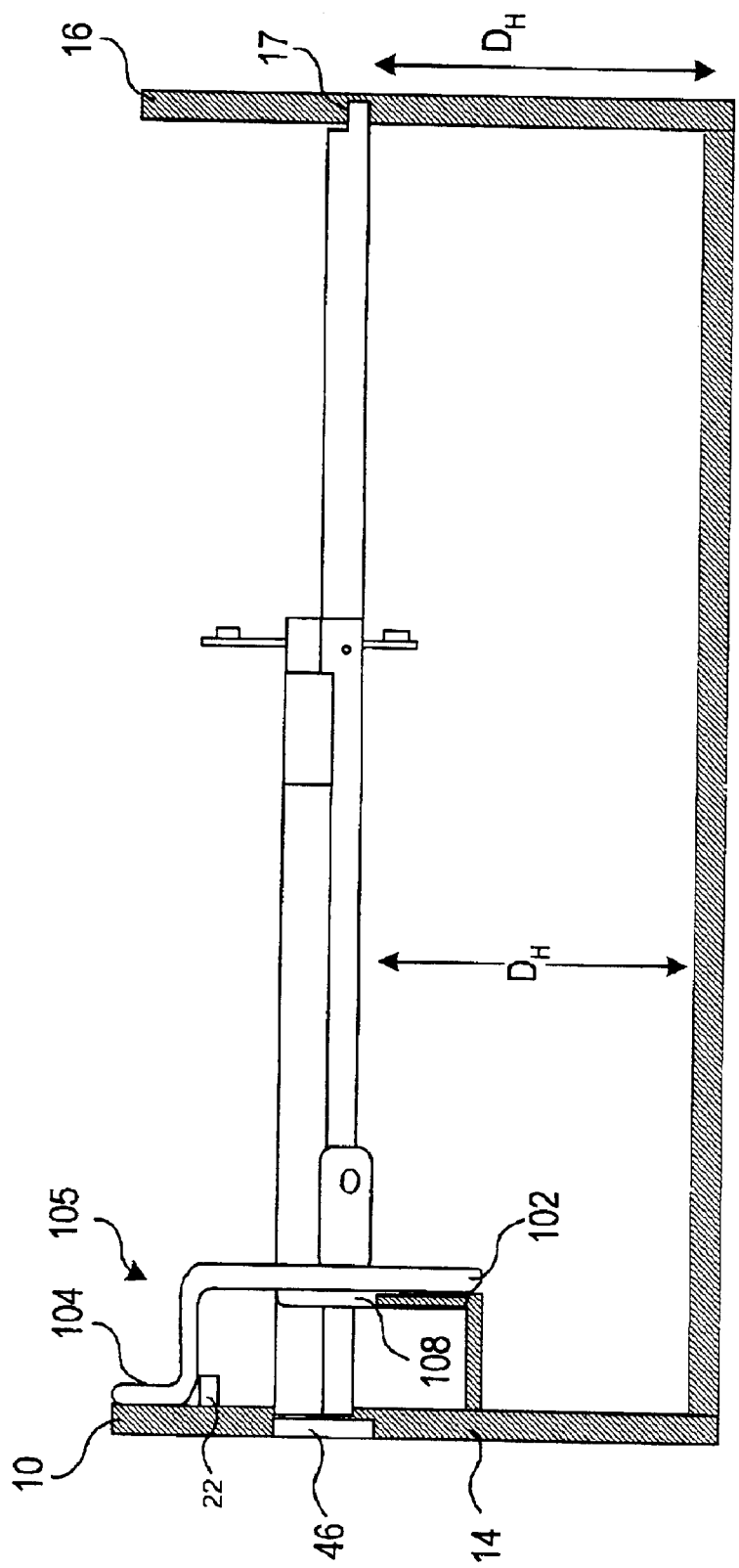
FIG. 4F is a cross-sectional side view of the chassis of FIGS. 4D–4E showing the face panel of the bracket of the invention fully engaged with the lance on the frame of the chassis and front face of the peripheral device fully seated in the chassis panel.
Figure 5A:
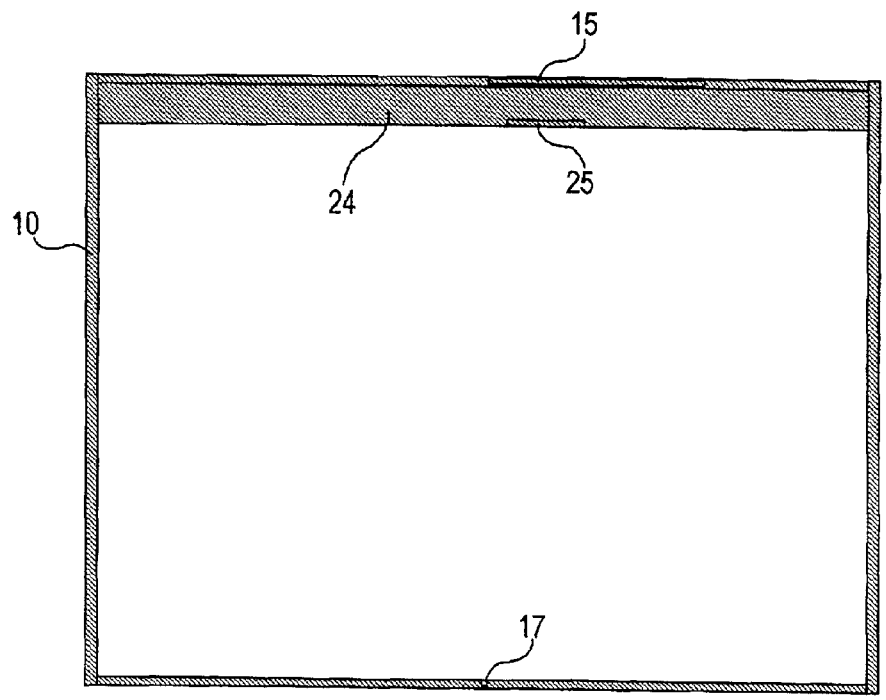
FIG. 5A is a cross-sectional top view of the chassis of FIGS. 4A–4E without the bracketed peripheral device installed therein.
Figure 5B:
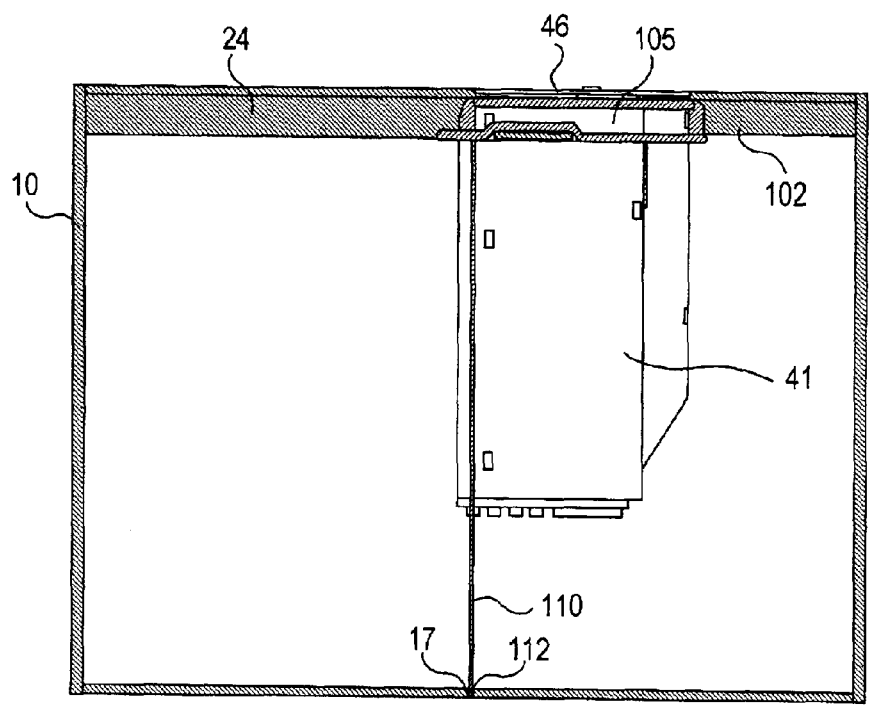
FIG. 5B is a cross-sectional top view of the chassis of FIG. 5A with the bracketed peripheral device installed therein.

The support bar tab 112 on the support bar 110 of bracket 100 with peripheral device 40 attached thereto is inserted in the support tab slot 17 positioned along the lateral face 16 of the chassis 10 (which may include either the chassis panel or frame) opposite that of the lateral face 14 (see FIG. 5A), as shown in FIG. 4D. The face plate 102 is pivoted towards the lateral face 14 of the chassis 10, and the hook portion 108 of the face plate 102 engages and hooks behind the chassis lance 25, as illustrated in FIG. 4E. As this occurs, the front panel 46 of the peripheral device 40 commences entry into the aperture 15 of the lateral face 14 of the chassis 10. The bracketed peripheral device 40 is manually pressed downward until the front panel 46 of the peripheral device 40 snaps into fully seated position within the aperture 15, as illustrated in FIGS. 4F and 5B.

The length $D_L$ of the support bar 110 (see FIG. 2D) is such that when the peripheral device 40 is properly seated in the bay 12 of the chassis 10 using the bracket 100 of the invention, the front panel 46 of the peripheral device 40 aligns flush within the aperture 15 of the lateral face 14 of the chassis, and allows no lateral movement of the bracketed peripheral device between the lateral 14 and opposing lateral 16 faces.

As also illustrated in FIG. 4E, the fully seated position of the bracketed peripheral device 40 is such that the L-shape bracket seat 105 coincides with the upper L-shape surface of the frame bar 22 on the lateral face 14 of the chassis 10. Although the peripheral device 40 is securely fixed in place within the bay 12 of the chassis 10 without further attachment means, for added security, for example in the event that the computer system is dropped upside down, the vertical portion 104 of the bracket seat 105 may be fastened to the frame bar 22 using known attachment means such as screws.

It will be appreciated that in the preferred embodiment the shape of the face plate 102 is configured such that when the bracketed peripheral device 40 is properly seated in the bay 12 of the chassis 10, electromagnetic radiation is fully prevented from escaping the bay 12 by way of the aperture 15 of the lateral face 14 of the chassis 10. To this end, the aperture 15 of the lateral face 14 of the chassis 10 is substantially form-fitting to the shape of the front panel 46 of the peripheral device 40. The aperture 106 of the face plate 102 is likewise substantially form-fitting to the cross-sectional shape of the portion of the peripheral device 40 that will occupy the aperture 106 when the bracket 100 is properly attached to the peripheral device 40. In addition, the face plate 102 extends in each direction such that when the bracketed peripheral device 40 is properly seated in the bay, the face plate 102 abuts against the bay-side surface of the lateral face 40 of the chassis.

To remove the peripheral device 40 from the chassis 10, one need only reverse the steps of insertion. In particular, sufficient inward compressive force is applied to the front panel 46 of the peripheral device 40 such that the upper edge of the front panel 46 clears the aperture 15 of the lateral face 14 of the chassis. The hook portion 108 of the bracket 100 is then disengaged from the lance 25 by pulling the bracketed peripheral device 40 up and over the lance 25 to thereby unhook the face plate 102 of the bracket 100 from the lance 25. The support bar tab 112 may than be removed from the slot 17 of the opposite face 16 of the chassis 10, and the bracketed peripheral device 40 removed from the bay 12.

Figure 6A:
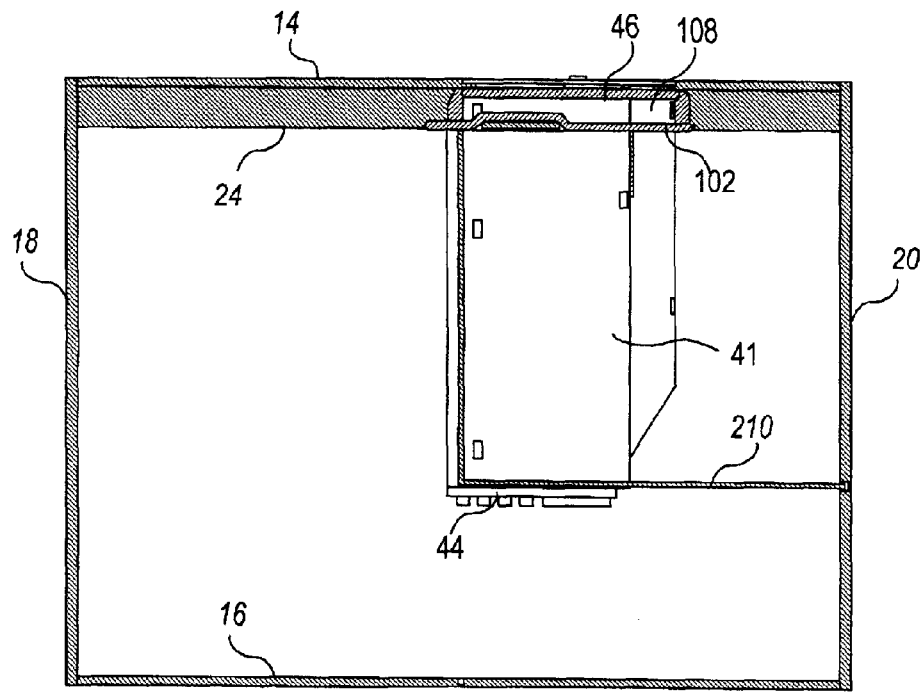
FIG. 6A is a cross-sectional top view of a chassis illustrating an alternative embodiment of the invention wherein the support bar is configured in an L-shape and is seated within a support tab slot in a chassis face adjacent to the lateral face of the chassis.
Figure 6B:
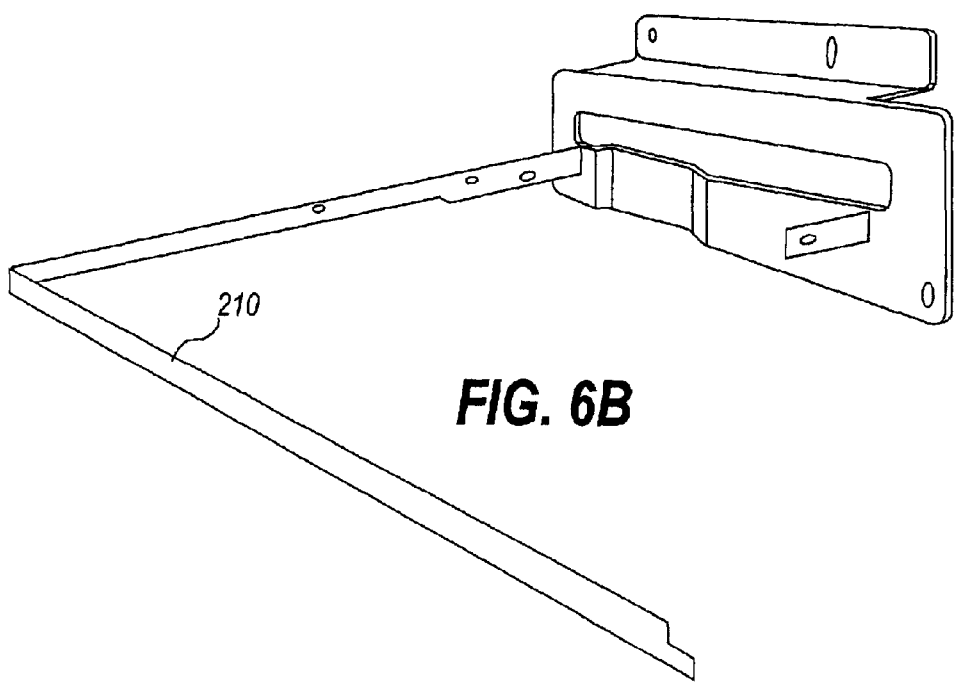
FIG. 6B is a perspective view of the bracket of FIG. 6A.
Figure 6E:
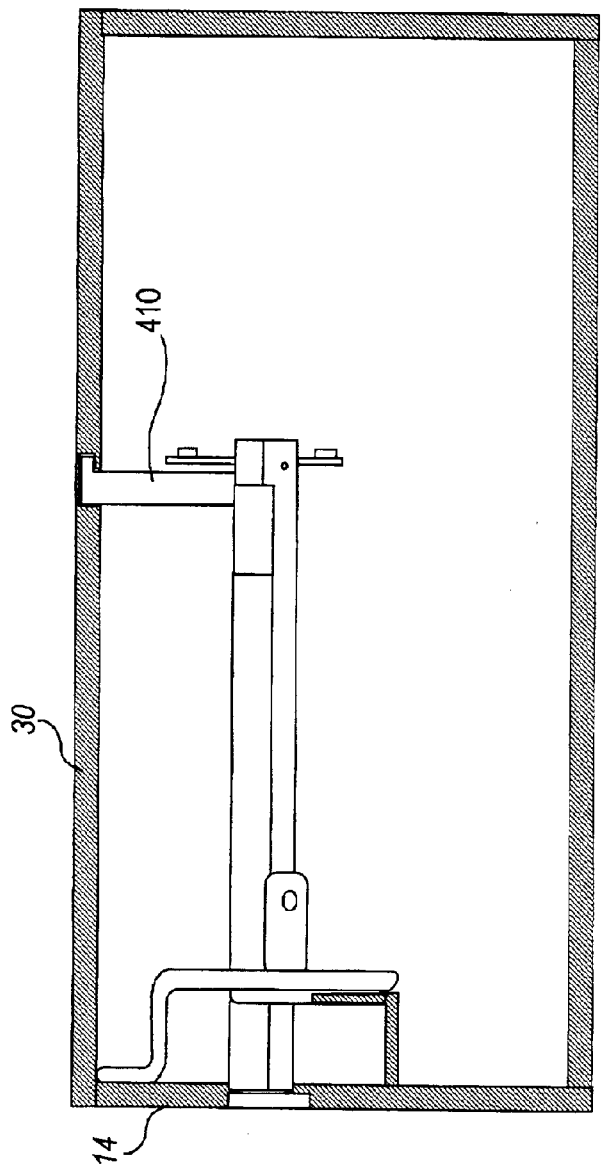
FIG. 6E is a cross-sectional view of a chassis illustrating an alternative embodiment of the invention wherein the support bar is hooked into the top face of the chassis.
Figure 6F:
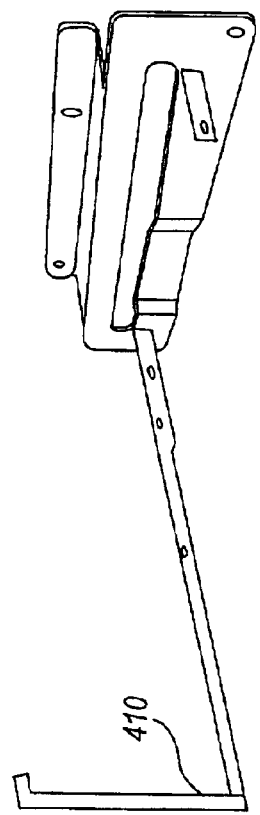
FIG. 6F is a perspective view of the bracket of FIG. 6E.
Figure 6G:
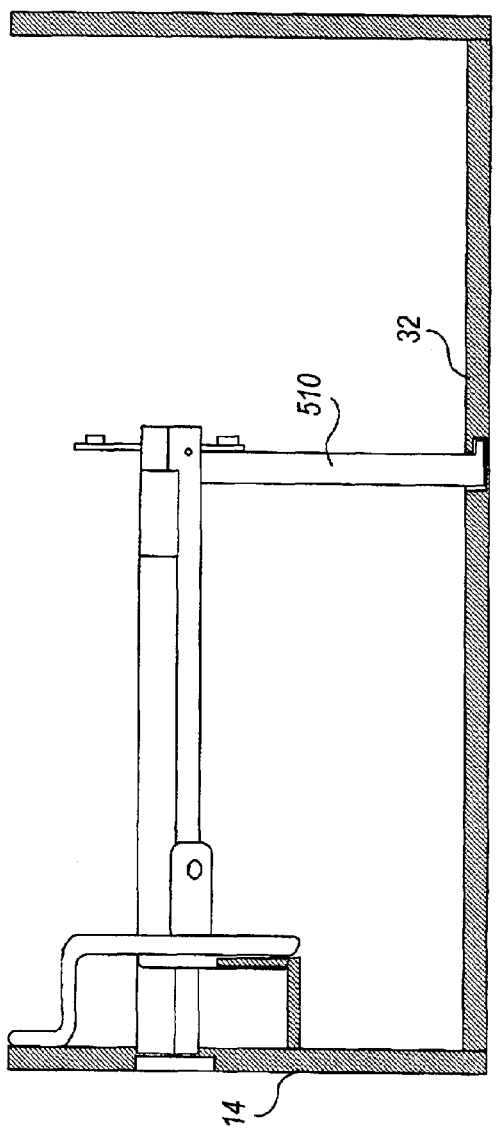
FIG. 6G is a cross-sectional view of a chassis illustrating an alternative embodiment wherein the support bar is hooked into the bottom face of the chassis.
Figure 6H:
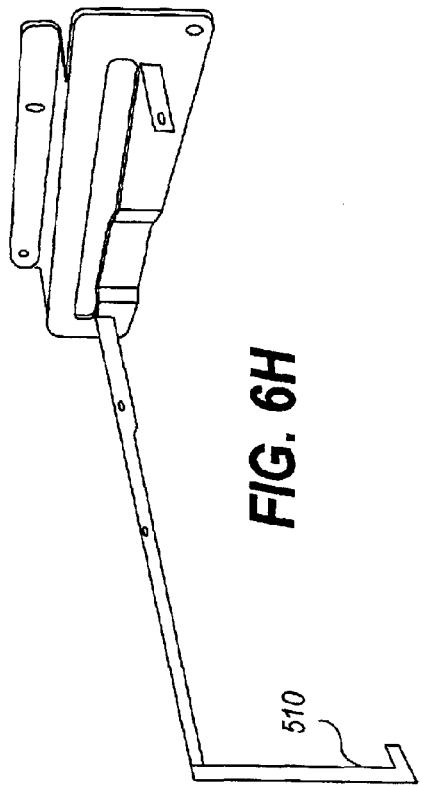
FIG. 6H is a perspective view of the bracket of FIG. 6G.

It will be appreciated that the inventive principles of the invention may be variously embodied. For example, the bracket may include not only a single support bar as illustrated in the preferred embodiment, but a plurality of similarly constructed support bars that operate merely to hold the proper vertical height $D_H$ (see FIG. 4F) of the peripheral device 40 in the bay 12. In addition, the support bar need not be hooked into the opposite face 16 of the lateral face 14 of the chassis, but may instead be hooked into a face 18 or 20 adjacent to the lateral face 14 of the chassis 10, wherein the support bar is configured in an L-shape 210 or T-shape 310, per the alternative embodiments shown in FIGS. 6A–6D. Additionally, the support bar may be hooked into the top face 22 of the chassis, per the alternative embodiment 410 shown in FIGS. 6E–6F, or into the bottom face 24 of the chassis, per the alternative embodiment 510 shown in FIGS. 6G–6H.

As described above, the present invention provides a novel bracket for securely attaching a peripheral device of a computer system to the system chassis. The invention allows fast simple attachment and removal of the peripheral device without requiring any specialized equipment, thereby reducing the time and costs of computer system assembly and disassembly during both mass-production assembly and individual unit test and repair.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. For example, it should be understood that the term "peripheral device" as used in both the specification and the claims includes any autonomous or semi-autonomous device that is typically mountable in a bay in a computer chassis, including but not limited to permanent and removable hard disk drives, floppy disk drives, CD and/or DVD ROM drives, modems, digital video disk drives, zip drives, tape drives, rotary cooling fans, and any peripheral computer component herein known or hereinafter developed. It should also be understood that the term "computer system" as used in both the specification and the claims includes any electronic instrument, computer, or electrical system that is housed in a chassis and requires mounting of peripheral devices therein. It is also possible that other benefits or uses of the currently disclosed invention will become apparent over time.

What is claimed is:

1. A bracket for attaching a peripheral device within a bay of a chassis of a computer system, said chassis comprising a first face having a chassis face aperture therein, a second face, a support bar slot configured on said second face, and a chassis hooking mechanism, said bracket comprising:

a bracket face plate comprising a bracket face plate aperture for receiving a peripheral device therethrough;

a bracket hooking mechanism for detachably hooking to sad chassis hooking mechanism;

a support bar extending from said bracket face plate;

a support bar tab protruding from said support bar; and a fastener for fastening said bracket to said peripheral device when said peripheral device is inserted through said bracket face plate aperture and seated therein in a predetermined position;

wherein a front panel of said peripheral device is made accessible through said chassis face aperture when said peripheral device is fastened to said bracket with said fastener, said support bar tab is seated in said support bar slot, and said bracket hooking mechanism is detachably hooked to said chassis hooking mechanism.

2. A bracket in accordance with claim 1, wherein:
said chassis hooking mechanism comprises a chassis tab; and
said bracket hooking mechanism comprises a hook portion configured to hook around said chassis tab.

3. A bracket in accordance with claim 1, wherein:
said bracket face plate aperture is form-fitted to a circumferential shape of a cross-sectional portion of said peripheral device within said bracket face plate aperture when said peripheral device is fastened to said bracket with said fastener.

4. A bracket in accordance with claim 1, wherein:
said chassis face aperture is form-fitted to a circumferential shape of said front panel of said peripheral device.

5. A bracket in accordance with claim 1, wherein:
said second face of said chassis comprises a face opposite to said first face.

6. A bracket in accordance with claim 1, wherein:
said second face of said chassis comprises a face adjacent to said first face.

7. A bracket in accordance with claim 1, wherein:
said bracket face plate is configured to seal said chassis face aperture when said peripheral device is fastened to said bracket with said fastener, said support-bar tab is seated in said support bar slot, and said bracket hooking mechanism is detachably hooked to said chassis hooking mechanism, to prevent electromagnetic radiation from passing through said chassis face aperture.

8. A bracket in accordance with claim 1, comprising:
at least one additional support bar extending from said bracket face plate, each having a corresponding support bar tab which fits into a corresponding additional support tab slot in said chassis.

9. A computer system housing, comprising:
a chassis comprising a bay for receiving a peripheral device, said bay comprising a first face having a chassis face aperture therein, a second face, a chassis hooking mechanism, and a support bar slot configured on said second face;
a peripheral device having a front panel and a body;
a bracket attached to said peripheral device, said bracket comprising:
  a bracket face plate comprising a bracket face plate aperture for receiving a peripheral device therethrough;
  a bracket hooking mechanism for detachably hooking to said chassis hooking mechanism;
  a support bar extending from said bracket face plate;
  a support bar tab protruding from said support bar; and
  a fastener for fastening said bracket to said peripheral device when said peripheral device is inserted through said bracket face plate aperture and seated therein in a predetermined position;
wherein a front panel of said peripheral device is made accessible through said chassis face aperture when said peripheral device is fastened to said bracket with said fastener, said support bar tab is seated in said support bar slot, and said bracket hooking mechanism is detachably hooked to said chassis hooking mechanism.

10. A computer system housing in accordance with claim 9, wherein:
said chassis hooking mechanism comprises a chassis tab; and
said bracket hooking mechanism comprises a hook portion configured to hook around said chassis tab.

11. A computer system housing in accordance with claim 9, wherein:
said bracket face plate aperture is form-fitted to a circumferential shape of across-sectional portion of said peripheral device within said bracket face plate aperture when said peripheral device is fastened to said bracket with said fastener.

12. A computer system housing in accordance with claim 9, wherein:
said chassis face aperture is form-fitted to a circumferential shape of said front panel of said peripheral device.

13. A computer system housing in accordance with claim 9, wherein:
said second face of said chassis comprises a face opposite to said first face.

14. A computer system housing in accordance with claim 9, wherein:
said second face of said chassis comprises a face adjacent to said first face.

15. A computer system housing in accordance with claim 9, wherein:
said bracket face plate is configured to seal said chassis face aperture when said peripheral device is fastened to said bracket with said fastener, said support bar tab is seated in said support bar slot, and said bracket hooking mechanism is detachably hooked to said chassis hooking mechanism, to prevent electromagnetic radiation from passing through said chassis face aperture.

16. A computer system in accordance with claim 9, comprising:
at least one additional support bar extending from said bracket face plate, each having a corresponding support bar tab which fits into a corresponding additional support tab slot in said chassis.

17. A method for attaching a peripheral device to a face of a chassis with a bracket, said bracket comprising a bracket body having a bracket body aperture therein, a support bar extending from said bracket body, and a support bar tab protruding from said support bar, said method comprising:
inserting said peripheral device through said bracket body aperture;
seating said peripheral device within said bracket body aperture at a predetermined position;
fastening said peripheral device to said bracket body when said peripheral device is inserted through said bracket face plate aperture and seated therein at said predetermined position;
inserting said support bar tab of said bracket into a support tab slot on a first face of said chassis;
pivoting said bracket towards a second face of said chassis, said second face having an aperture therein form-fitted to the shape of said front panel of said peripheral device; and
positioning said front panel of said peripheral device into alignment within said aperture of said second face of said chassis.

18. A method in accordance with claim 17, wherein said positioning step comprises:
hooking said bracket body over a protruding member attached to said second face of said chassis.

19. A method for removing a peripheral device from the bay of a chassis, said peripheral device having a front panel aligned within a chassis aperture of a first face of said chassis and attached to said chassis with a bracket, said bracket comprising a bracket body having a bracket body aperture therein, a support bar extending from said bracket body, and a support bar tab protruding from said support bar and extending into a support tab slot on a second face of said chassis, said method comprising:

compressing said front panel of said peripheral device into said bay of said chassis such that it clears an upper edge of said chassis aperture; and pivoting said bracket away from said chassis aperture inside said bay; and removing said support bar tab on said support bar of said bracket from said support tab slot.

20. A method in accordance with claim 19, wherein:

prior to said pivoting step, unhooking a hook portion on said bracket body from a protruding member on said chassis.

\* \* \* \* \*